US007039565B1

(12) United States Patent
Jin et al.

(10) Patent No.: US 7,039,565 B1
(45) Date of Patent: May 2, 2006

(54) METHOD AND SYSTEM FOR DEVELOPING A NUMERICAL DYNAMIC SANITARY SEWER AND STORM WATER DRAINAGE SIMULATION MODEL

(75) Inventors: Ming Jin, Olney, MD (US); Samuel R. Coran, Waterbury, CT (US); Jack S. Cook, Jr., Bethlehem, CT (US); Danny L. Fread, Westminster, MD (US)

(73) Assignee: Haestad Methods, Inc., Waterbury, CT (US)

( * ) Notice: Subject to any disclaimer, the term of this patent is extended or adjusted under 35 U.S.C. 154(b) by 671 days.

(21) Appl. No.: 10/336,473

(22) Filed: Jan. 3, 2003

(51) Int. Cl.
*G06F 17/10* (2006.01)
*G06F 7/48* (2006.01)

(52) U.S. Cl. .............................................. 703/2; 703/9

(58) Field of Classification Search .................. 703/2, 703/9; 707/103 R, 203; 717/101; 2/400
See application file for complete search history.

(56) References Cited

U.S. PATENT DOCUMENTS

| 5,511,188 | A | | 4/1996 | Pascucci et al. ............ 707/203 |
|---|---|---|---|---|
| 5,758,347 | A | | 5/1998 | Lo et al. ..................... 2/400 |
| 5,787,283 | A | | 7/1998 | Chin et al. .................. 717/101 |
| 5,835,386 | A | * | 11/1998 | Orr et al. ........................ 703/2 |
| 6,119,125 | A | | 9/2000 | Gloudeman et al. ..... 707/103 R |
| 6,247,019 | B1 | | 6/2001 | Davies .................. 707/103 R |

OTHER PUBLICATIONS

Price, R.K. The Influence of Engineering Software for the Design and Analysis of Urban Storm Drainage, Proceedings of the 4th Int. Conference on Engineering Software, Jun. 1985, pp. 12/15-22.*
Zoppou, C. Review of Storm Water Models, Google, CSIRO Land and Water, Canberra, Technical Report 52/99, Dec. 1999.*
Dunn et al., S.M. Natural Flows in Managed Catchments: A Case Study of a Modeling Approach, Water Research, vol. 33, No. 3, Feb. 1999, pp. 621-630.*
Previdi et al., F. Identification of Urban Drainage Network Rainfall-Runoff Black-Box Models, Proceedings of the 1998 IEEE Int. Conference on Control Applications, Sep. 1998, pp. 1255-1259.*

(Continued)

*Primary Examiner*—Russell Frejd
(74) *Attorney, Agent, or Firm*—Cesari & McKenna LLP

(57) ABSTRACT

An hydraulics software system for a one-dimensional hydrodynamic numerical model for modeling unsteady flows in sewer and storm water urban drainage systems is provided. The inventive software uses as a numerical model, an implicit four-point, finite-difference solution technique to solve the one-dimensional Saint-Venant equations. The software is designed to select that numerical model, or equation that best describes, or best exhibits the behavior of each of the various structures and flows encountered in complex hydrodynamic systems such as a sewer and storm water drainage systems. Local partial initial modification for subcritical and supercritical transcritical flows is provided. Relaxation for pipe/channel networks are included for achieving computational performance and robustness for commercial software for practical use in water resource engineering.

12 Claims, 6 Drawing Sheets

OTHER PUBLICATIONS

Sumic et al., Z. Automated Underground Residential Distribution Design, II. Prototype Implementations and Results, IEEE Transactions on Power Delivery, vol. 8, No. 2, Apr. 1993, pp. 644-650.*

Tanaka et al., N. An Optimal Operation Model of an Urban Drainage System Under Partial State Observation, 1999 IEEE Int. Conference on Systems, Man, and Cybernetics, vol. 5, Oct. 1999, pp. 967-972.*

Computer Models and Softwares, Google, The "State-of-the-Art" of Computer Modelling for Stormwater Drainage, Dec. 1999.*

Robadue et al., D. Missing Links in Water Pollution Control: The Case of Cobined Sewer Overflows in Upper Narragansett Bay, OCEANS, IEEE, vol. 17, Nov. 1985, pp. 889-894.*

Yen, Ben C., Chapter 6: "Hydraulics of Sewer Systems", in Stormwater Collection Systems Design Handbook, ed., Dept. of Civil & Environmental Engineering, Univ. of Illinois at Urbana-Champaign, Urbana, Illinois 61801, pp. 6.1-6.113.

Fread, D.L., Chapter 10: "Flow Routing", in Handbook of Hydrology, ed., Hydrologic Research Laboratory, National Weather Service, NOAA, Silver Spring, MD, pp. 10.1-10.36.

Ming Jin and Danny L. Fread, Journal of Hydraulic Engineering, Jan. 2000, vol. 126, No. 1, American Society of Civil Engineers, pp. 89-91.

Ming Jin and Danny L. Fread, Journal of Hydraulic Engineering, Aug. 1999, vol. 25, No. 8, American Society of Civil Engineers, Water Resources Engineering Division, pp. 827-834.

Ming Jin and Danny L. Fread, Journal of Hydraulic Engineering, 1997, American Society of Civil Engineers, vol. 123, No. 3, "Dynamic Flood Routing with Explicit and Implicit Numerical Solution Schemes", pp. 166-173.

Boulos, Paul F. et al. "Explicit Calculation of Pipe-Network Parameters", submitted for review on Mar. 5, 1990, Journal of Hydraulic Engineering, vol. 116, No. 11, Nov. 1990, pp. 1329-1344.

Jin, Ming et al., "New One-Dimensional Implicit Numerical Dynamic Sewer and Storm Model", Global Solutions for Urban Drainage 9ICUD, Proceedings of the Ninth International Conference on Urban Drainage, ASCE, Sep. 8-13, 2002, Portland, OR, pp. 1-9.

* cited by examiner

METHOD AND SYSTEM FOR DEVELOPING A NUMERICAL DYNAMIC SANITARY SEWER AND STORM WATER DRAINAGE SIMULATION MODEL

BACKGROUND OF THE INVENTION

1. Field of the Invention

This invention relates to computer programs for modeling of hydraulics systems, and in particular, software for modeling of sewer and storm water systems.

2. Background Information

A typical sewer and storm water drainage system consists of a labyrinth of underground pipes leading from homes and buildings to a municipal sewage network that may include large tunnels and open channels, as well as an above ground system of drainage and runoff areas at roadsides, natural waterways and the like that lead to sewer openings and manholes. All of these are connected at junctions and interchanges that can include various hydraulic structures and natural barriers. Moreover, with ever increasing urbanization and urban renewal, there is an concomitant increase in drainage and water quality requirements, and thus, sanitary sewer and storm water systems are becoming even more complex, and yet more important to the growing communities that these systems serve.

The hydraulic characteristics of a complex sewer and storm drainage system often exhibit many complicated features, such as backwater effects from a downstream boundary or from hydraulic structures. The variety of structures that can be present in such a system is practically unlimited. The hydraulic structures can include culverts, bridges, weirs, spillways, contractions and expansions, either natural or constructed. There are also confluence interactions at junctions of a pipe network, interchanges between surcharged pressure flow and gravity flow conditions, street-flooding from overloaded pipes, as well as bifurcated pipe networks.

To better understand the complicated hydraulic features presented by such complex systems and to accurately simulate flows in this type of complicated sewer or storm water system, a software model is used as a tool to design, simulate and/or analyze these systems. To describe the complex hydraulic structures and flows, hydrodynamic approaches and unsteady flow models are needed. As part of the simulation, system behavior, including time variations in sanitary and storm water drainage flow events are also becoming of more interest to the engineering community.

Conventionally, in order to simulate unsteady flows in sewer or storm water drainage systems, numerical computational techniques have been the primary tools for such calculations. The results from numerical models are widely used for planning, designing and operational purposes. As noted, since an urban drainage system can be composed of thousands of pipes and many hydraulic structures, the hydraulics in many sewer and storm systems can exhibit very complicated flow conditions. The numerical stability, computational performance, capabilities and robustness and handling of such complicated is hydraulic conditions with computational accuracy are all factors that must be taken into account when engineers select a model for practical engineering use.

Many numerical models have been developed to simulate unsteady flows in sewer and storm water systems. Many are based on explicit numerical schemes. Some are based on implicit schemes and limitations exist for most of such models. Many models include using a steady system model and apply approximation techniques and case wise steady flow combinations, to approximate unsteady flow conditions. This has disadvantages in that the approximation is not entirely accurate.

Other numerical schemes used to simulate unsteady flows in sewer/drainage systems include solving complete dynamic equations. Most dynamic models have been developed using one of the following different numerical techniques: a) characteristic methods; b) explicit finite-difference schemes; and c) implicit finite-difference schemes (with six points or four points). Among these techniques, the implicit methods have the advantage of maintaining good stability for large computational time steps and exhibit robustness in modeling very complex situations, such as interchanges between gravity flows and pressure flows, pipe network flow and storage effect for street flooding, bifurcated pipe networks, flow regime changes between subcritical and supercritical conditions and the like.

Of the various implicit, finite-difference schemes, a weighted four-point scheme has been used in a United States National Weather Service Dynamic River Routing Model (FLDWAV) (sometimes referred to as "FLOODWAVE"), which is commercially available. It has been successfully used with unequal distance steps.

There remains a need, therefore, for a software program for developing a model of a sanitary sewer and storm drainage systems that meets the increasingly difficult challenges of modeling complicated unsteady flows in large, complex sewer and storm water systems. It is thus an object of the present invention to provide a method and software system for developing a model for unsteady flows in sewer and storm water systems that exhibits excellent computational performance, numerical stability and robustness.

SUMMARY OF THE INVENTION

The disadvantages of prior techniques are overcome by the solutions provided by the present invention, which is a water resource engineering software program and associated method by which a numerical hydrodynamic model of unsteady flows in sewer and storm water systems can be developed. The software program uses an implicit four-point, finite-difference solution technique to solve the complete and extended one-dimensional Saint-Venant continuity and momentum equations. The present invention provides an improvement and extension of the FLOODWAVE National Weather Service routing model, or similar software, to provide solutions for these equations to describe sewer branches in sewer networks, internal and external boundaries, as well as pressure flows and street flooding conditions. Initial conditions can be set as desired or retrieved from previously saved conditions. The software is designed to automatically select that numerical model, or equation, that best describes, or best exhibits the behavior of, each of the various structures and flows encountered in complex hydrodynamic systems such as a sewer and storm water drainage system.

BRIEF DESCRIPTION OF THE DRAWINGS

The invention description below refers to the accompanying drawings, of which.

DETAILED DESCRIPTION OF AN ILLUSTRATIVE EMBODIMENT

Figure 1:
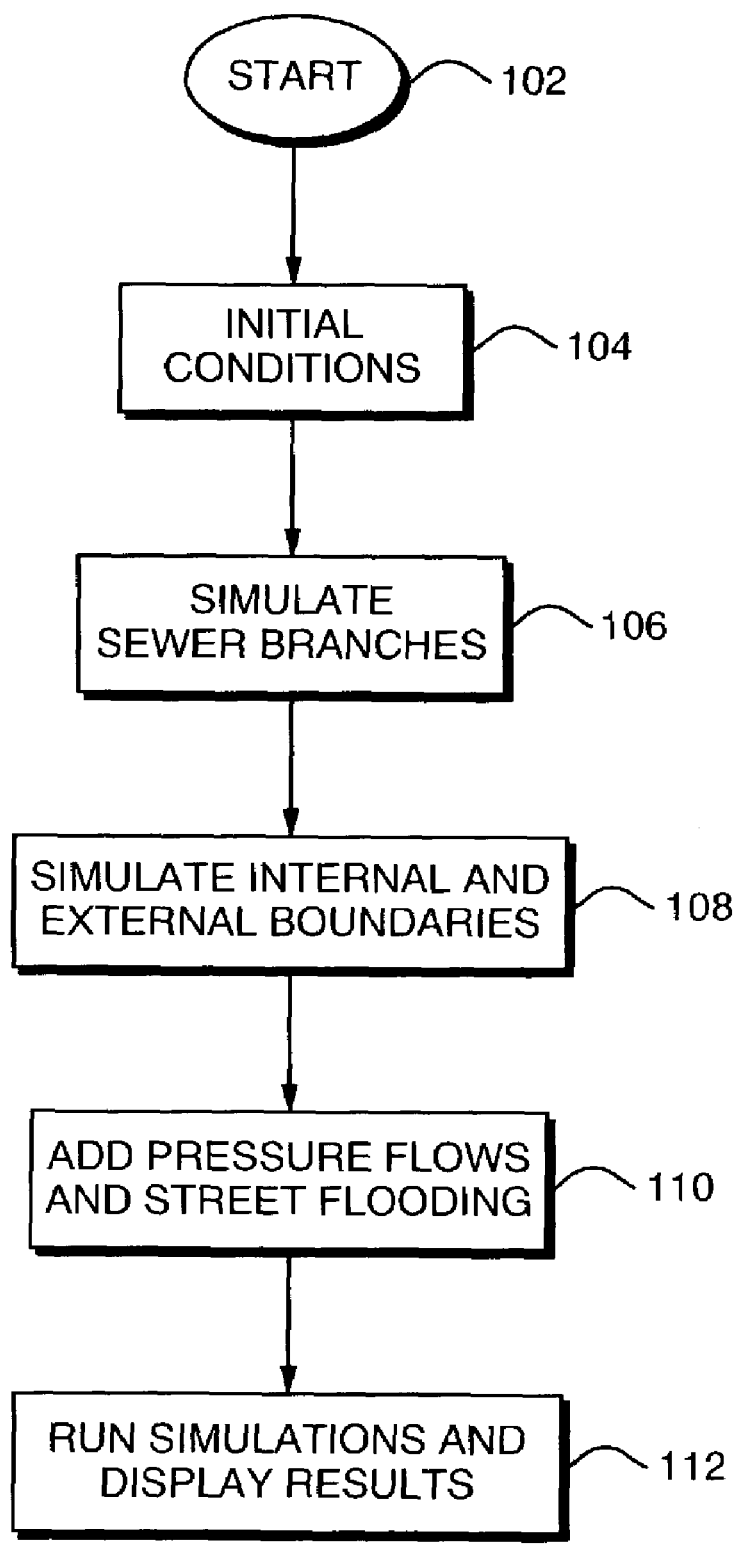
FIG. 1 is a flow chart of the overall procedure followed in accordance with the software program of the present invention.
Figure 2:
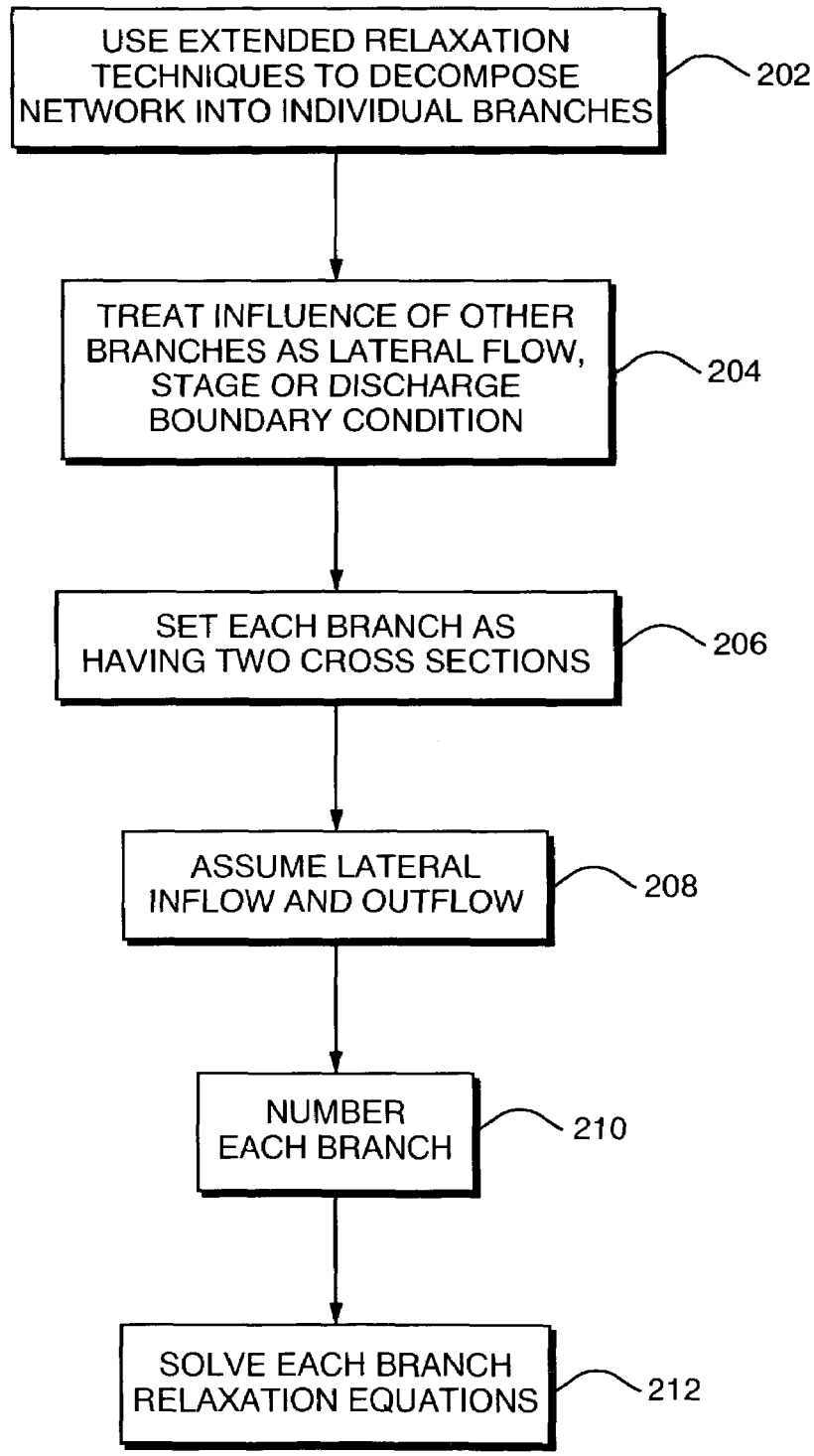
FIG. 2 is a flow chart of a procedure illustrating the steps followed in producing the model for a sewer pipe network.

For purposes of clarity of illustration, some background regarding the governing equations that are generally used by engineers in modeling unsteady flows in sewer and storm water urban drainage systems will be described.

As will be understood by those skilled in the art, flows in sewer and storm water pipes are usually free surface open-channel flows, therefore the Saint-Venant equations of one-dimensional unsteady flow in non-prismatic channels or conduits are the basic equations used for describing these unsteady sewer flows. The first equation (Eq. 1) is the basic continuity equation and the second equation (Eq. 2) is the basic momentum equation, giving the following complete and extended equations:

$$\frac{\partial Q}{\partial x} + \frac{\partial (A + Ao)}{\partial t} - \partial = 0 \quad (1)$$

$$\frac{\partial Q}{\partial t} + \frac{\partial (\beta Q^2 / A)}{\partial x} + gA\left(\frac{\partial y}{\partial x} - S_o + S_f + S_i\right) + L = 0 \quad (2)$$

The National Weather Service dynamic river routing model, FLDWAV, uses the following implicit, finite-difference scheme, that is a weighted four-point scheme:

$$\frac{\partial f}{\partial t} = \frac{f_i^{j+1} + f_{i+1}^{j+1} - f_i^j - f_{i+1}^j}{2\Delta t_j} \quad (3)$$

$$\frac{\partial f}{\partial x} = \frac{\theta(f_{i+1}^{j+1} - f_i^{j+1}) + (1-\theta)(f_{i+1}^j - f_i^j)}{\Delta x_i} \quad (4)$$

$$f = \frac{\theta(f_i^{j+1} + f_{i+1}^{j+1}) + (1-\theta)(f_i^j + f_{i+1}^j)}{2} \quad (5)$$

in which $\theta$ is a weighting factor and the weighted four-point implicit scheme is unconditionally stable for $\theta \geq 0.5$. The value of $\theta$ of 0.6–0.8 is found to be optimal in maintaining stability and accuracy for large computational time steps.

In accordance with the present invention, a Newton-Raphson iteration method (the application of which will be understood by those skilled in the art) is used to solve the finite-difference equations derived from applying Eqs. 3 to 4 to Eqs. 1 and 2. However, in accordance with the invention, the momentum equation is first modified to take into account the ranges of slopes that can exist in a sewer and storm water drainage network.

More specifically, one of the challenging features in describing the unsteady flows in a sewer or storm water drainage system are the interchanges or moving interfaces of different flow regimes between subcritical and supercritical flows. This is largely due to the fact that an urban drainage system can have a large range of slopes of conduits, and it is common to have significant slope changes at many pipe junctions. This range of slopes can result in different flow regimes. One way of describing a flow regime is to use a Froude number ($F_r$). The Froude number is a dimensionless parameter that is the ratio of inertial to gravitational force of a moving object or flow. The flow condition at which gravitational acceleration is the dominant governing force is know as "subcritical flow" and it is the case where the Froude number is defined to be less than 1.0. The flow condition for which inertia is the dominant governing force is known as "supercritical flow" and the Froude number is defined to be greater than 1.0 in such a case.

When modeling unsteady flows, the dynamic routing technique using the four-point implicit numerical scheme tends to be less numerically stable than the diffusion (zero inertia) routing technique for certain mixed flows, especially in the near critical range of the Froude number ($F_r$) or mixed flows with moving supercritical/subcritical interfaces. It has been observed that the diffusion technique, which eliminates the two inertial terms in the momentum equation, produces stable numerical solutions for flows where $F_r$ is in the range of critical flow ($F_r=1.0$) and for supercritical flows ($F_r>1.0$).

To take advantage of the diffusion method's stability and retain the accuracy of the fully dynamic method, the software program of the present invention employs a Local Partial Initial modification (LPI) technique. In the LPI technique, the momentum equation, Eq. (2), is modified by a numerical filter, $\sigma$, so that the inertial terms are partially or totally omitted based on the time-dependent local hydraulic conditions. The modified equation and numerical filter are:

$$\sigma\left[\frac{\partial Q}{\partial t} + \frac{\partial (\beta Q^2 / A)}{\partial x}\right] + gA\left(\frac{\partial y}{\partial x} - S_o + S_f + S_i\right) + L = 0 \quad (6)$$

in which $\sigma$ is a numerical modifier and its value for every finite-difference box (between $X_i$ and $X_{i+1}$) will be determined at each time step by the following equation:

$$\sigma = \begin{cases} 1.0 - Fr^m & F_r \leq 1.0 \\ 0 & F_r > 1.0 \end{cases} \quad (7)$$

in which m is a user specified constant and $m \geq 1.0$. Preferably, smaller values of m are used because they tend to stabilize the solution, while in other cases larger values of m are preferably used when it is desired to provide greater accuracy.

The software program of the present invention uses the above-identified equations to produce the resulting model of a sewer and storm water drainage system. Referring to FIG. 1, a flow chart illustrates the procedure 100 followed by the program. The process begins at step 102, and initial conditions are set and data is retrieved from an associated database about the sewer and storm water drainage system to be modeled, as shown in step 104. This data could be entered by the water engineer or programmer. The data includes details about pipes including parameters such as pipe length, pipe diameter, and whether it is a pressure flow, or gravity flow, or open-channel or closed conduit. Each junction connecting two pipes is identified and numbered. Pressure flows and street drainage areas, as well as hydraulic structures in the system as also described and identified.

The software program then parses the sewer and storm water drainage network into individual hydraulic categories. For each category, the program selects the equations and numerical techniques that best describe, or best exhibit the behavior of those components in that hydraulic category. The flow chart of FIG. 1 illustrates the various categories, while the separate procedures that are thus followed by the software program for each are described in further detail with reference to FIGS. 2 through 5. It should be understood, however, that these steps are briefly mentioned with reference to FIG. 1 for clarity of illustration. The order of discussion does not suggest or require that the program perform these steps in any particular order, and it is within the scope of the present invention that each aspect of the program can be performed independently or in a different order than that shown, and some may be omitted entirely from certain simulations when the subject matter of that aspect of the program is not relevant or desired in a particular application of the program.

Returning now to FIG. 1, as illustrated in step 106, the software program proceeds to simulate the sewer pipe network of the system. The sewer pipe network is the system of pipes that exit homes and buildings in the urban area being studied. In accordance with this aspect of the invention, the sewer pipe network is decomposed into many single branches, and each branch is solved independently as discussed in further detail with reference to FIG. 2.

The internal and external boundaries in the system are then described and simulated as illustrated in step 108. These internal boundaries include manholes, junctions, controlling structures such as gates, weirs and dams, as well as storage facilities, ponds and reservoirs. These stretches of open areas are sometimes referred to as a "reach" or an "hydraulic reach." Any other reach, which needs to be treated differently than a normal dynamic reach, can be described and modeled using this step of the program. The normal dynamic reach or flow will have already been described using the sewer pipe network step.

The other aspect of the system that is described and simulated is that of the pressure flows and this is illustrated as step 110 of the procedure 100. Street flooding is also simulated as part of this step.

After each individual type of hydraulic component is described, and each flow regime is taken into account, the model is developed and then a simulation of the modeled system is run, as illustrated at step 112. The results can be displayed in any suitable form selected by the user, such as a graphic illustration of the network, tables and charts of flows, and graphs of other system behavior. The individual aspects of the program that cover each type of flow in the system will now be described in greater detail.

Solution for Sewer Networks

A sewer network can be as simple as a system of a few dendritical branches or as complicated as a system of hundreds of branches with many loops and various junctions containing different hydraulic structures and facilities, such as weirs and pumps. In many situations, the mutual flow interaction must be accounted for to achieve realistic results, particularly for unsteady flows since those confluence junctions can have significant effects on the traveling dynamic wave in a sewer system.

In order to simulate a complicated sewer network using implicit numerical schemes, a special algorithm has been included in the program of the present invention. More specifically, an extended relaxation technique (described below) is used to develop the model. As illustrated in the procedure 200 of FIG. 2, the extended relaxation algorithm decomposes the network of a sewer system into many single branches as illustrated in the step 202. Then, each individual branch is solved by the four-point implicit scheme, as illustrated in step 204. In doing so, the program of the present invention treats the influences of other branches as either lateral flows or as a stage or discharge boundary condition. Each branch is defined by two cross sections, which are located, just upstream and downstream of each of its junctions with other branches. During the numerical solution process, as shown in step 206, as each branch is solved by the Newton-Raphson iteration, an assumed lateral inflow or outflow is added at each junction reach to replace the confluence branch.

Next, step 208 illustrates that the branches are automatically numbered such that the dendritical branches are treated before the loop branches. Also, a connecting branch is numbered after the branch into which it is connected. This numbering scheme enables a stage boundary condition at the downstream of a branch to be determined using the average computed stages at the two confluence cross sections at the junction which the branch joins. Ultimately, in this way, as illustrated in step 210, each branch is independently solved one by one using the estimated lateral flows at each of the branch junctions. If the system has a total of J junctions, the relaxation is to iterate these J junction-related lateral flows. The relaxation equation for the lateral flows is:

$$q^* = (1-\alpha)q^{**} + \alpha Q \qquad (8)$$

in which $q^*$ is the estimated confluence lateral flow for the next iteration, $q^{**}$ is the previous estimated lateral flow, Q is the computed discharge at the downstream end of the connecting branch in the previous iteration, $\alpha$ is a weighting factor ($0_4\alpha_41.0$).

In accordance with the invention, values of $\alpha$ of between about 0.8 and 0.9 provide the most efficient convergence for the relaxation iteration. Extensive tests have shown that the relaxation iteration convergence is achieved within one to three iterations for almost all situations using $\alpha=0.6$.

Internal and External Boundaries

Hydraulically, an internal boundary is any internal computational reach for which special equations are used to replace one or both of Equations 1 and 2 normally applied to a friction-slope-determined-dynamic reach. These internal boundaries include manholes, junctions, controlling structures such as gates, weirs and dams, storage facilities such as ponds and reservoirs; or any particular reach which needs to be treated differently other than a normal dynamic reach. The external boundaries are those of most upstream and downstream boundaries in a sewer system for which a boundary condition, such as a discharge hydrograph, a tidal or stage hydrograph or an equation defining a relationship between stage and discharge is given.

Figure 3:
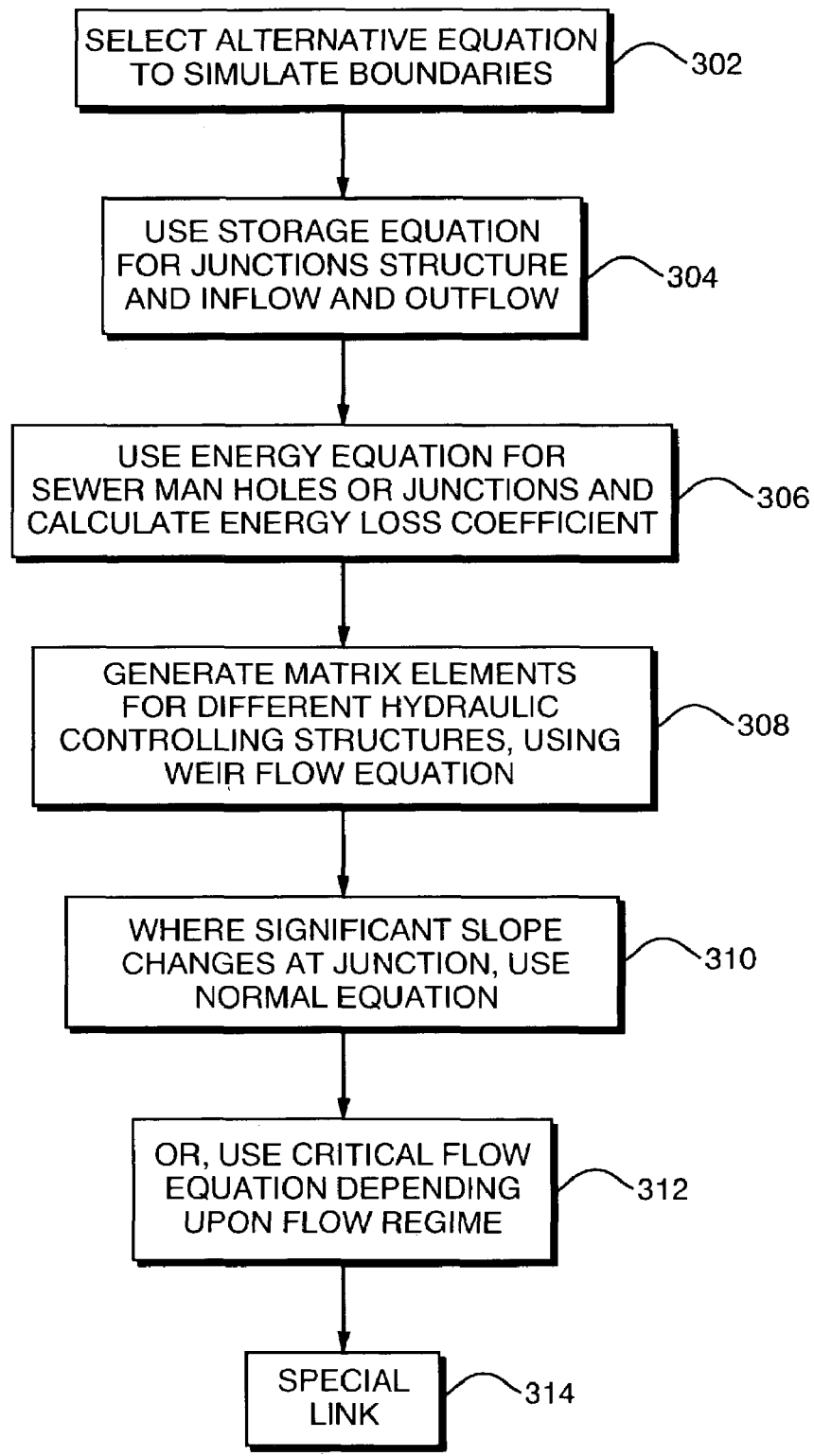
FIG. 3 is a flow chart of a procedure illustrating the steps followed in producing the model for internal or external boundaries.
Figure 4:
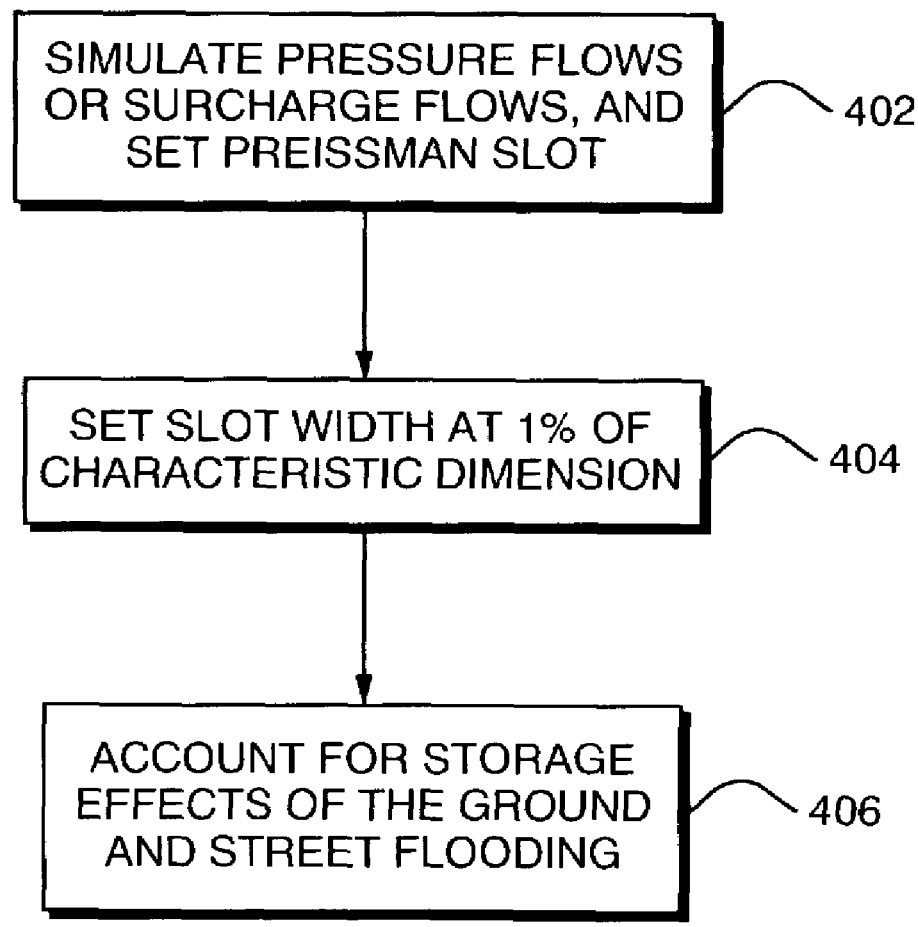
FIG. 4 is a flow chart of a procedure illustrating the steps followed in producing the model for pressure flows and street flooding.

The four-point implicit scheme used by the software program of the present invention for the model is very flexible to deal with any type of internal boundaries since the new equations for replacing Saint-Venant equations involve only the junction reach and its corresponding elements in the matrix. Therefore, the Newton iteration technique can typically still be used without any case-based modifications. As shown in FIG. 3, the procedure 300 of this aspect of the invention includes, as a first step 302, selecting the appropriate alternative equation to describe the internal or external boundary. Though not limiting to the invention, most of the commonly used alternative equations for simulating the internal boundaries are:

(a) A storage equation, which takes account of the dynamically changing storage volumes in a junction structure and inflows and outflow, is used to replace the continuity equation, Eq. L, step 304. The storage areas above the ground elevation are also represented by the storage equation to simulate the street flooding effects to the flows in the sewer pipes. The storage equation can also be applied to big ponds or reservoirs.

(b) An energy equation is usually used in sewer manholes or junctions to replace the Momentum equation, Eq. 2, step 306. Different methods to calculate the energy loss coefficient are provided.

(c) Some hydraulic equations, such as weir flow equations and gate flow equations, are used to automatically generate necessary matrix elements for different hydraulic controlling structures such as weirs, gates and dams to replace the momentum equation, illustrated as step 308. In accordance with another aspect of the invention, a user specified rating curve can also be used for certain internal boundaries.

(d) In the case of significant slope changes at a junction which results in an apparent flow regime change at the junction, sometimes the normal flow equation or the critical flow equation, depending on the flow regime change, is used to replace the momentum equation, as indicated in step 310.

(e) A special link (pipe or channel reach) can be predefined to simulate any complicated hydraulic structures, a universal hydraulic solver can be developed and called to generate EQT curves (relationships among head water, discharge and tailwater) and these curves are dynamically applied to the special reach, step 312.

As noted herein, these steps are set forth in the flow chart for purposes of illustrations, the software of the invention does not require that those steps be performed in any particular order, in fact the software program has the capability of selecting which equation to use depending on the hydraulic circumstances being described and simulated, so in any particular instance any one or more of the "steps" may be employed, depending upon the system being modeled, while remaining well within the scope of the present invention.

Pressure Flows and Street Flooding

As will be understood by those skilled in the art, the normal equations cannot be used, when the free surface disappears in a closed conduit that is flowing full. In that case, the software program of the present invention selects a Preissman slot technique to be used for the solution. The Preissman slot technique adds a narrow slot to the top of each closed conduit cross section, so that the conduit is never closed. In accordance with the present invention, the Preissman slot method is used for simulating pressure or surcharged flows. Preferably, the slot extends vertically from pipe crown to infinity and over the entire length the pipe, and the width of the slot is usually 1% of the characteristic pipe dimension (diameter for a circular pipe) but not large than 0.02 ft. The significant advantage in using hypothetical slot are apparent in simulating the moving transitional interface between open-channel flow and pressure flow, which can happen anywhere at any time in a sewer system, since the model uses same equations and numerical schemes and makes no special switches between open-channel flows and pressure flows.

In a junction where flow has open access to the ground, the storage effects of the ground are accounted by including the surface area and elevation data in the continuity or the storage equation. The storage areas above the ground can be represented by either user input table of areas and elevations or by model-defined smooth transition functions, which determine the areas from the junction, chamber area to about 1200 time of that chamber area. When the water elevation in the junction rises above the ground, the ground starts to store the water, which significantly attenuates the unsteady wave. As the water elevation recesses, the stored water drains back to the underground sewer system from the junction. Additionally, the model can account for flow losses at junctions if the water elevation reaches above defined highest street elevation.

Initial Conditions

The simulation for unsteady flows in a sewer system can start from an initially dry condition, or an initially steady base flow condition, or from an unsteady flow state.

For the dry flow condition, model assumes a very small initial steady flow (virtual flow) to start the simulation and this virtual flow has no effect to the computational results for any meaningful flows. The initially steady base flow condition is determined by backwater calculations. For the unsteady initial conditions, model can start the simulation by retrieving previously saved results as initial conditions.

EXAMPLE

Figure 5:
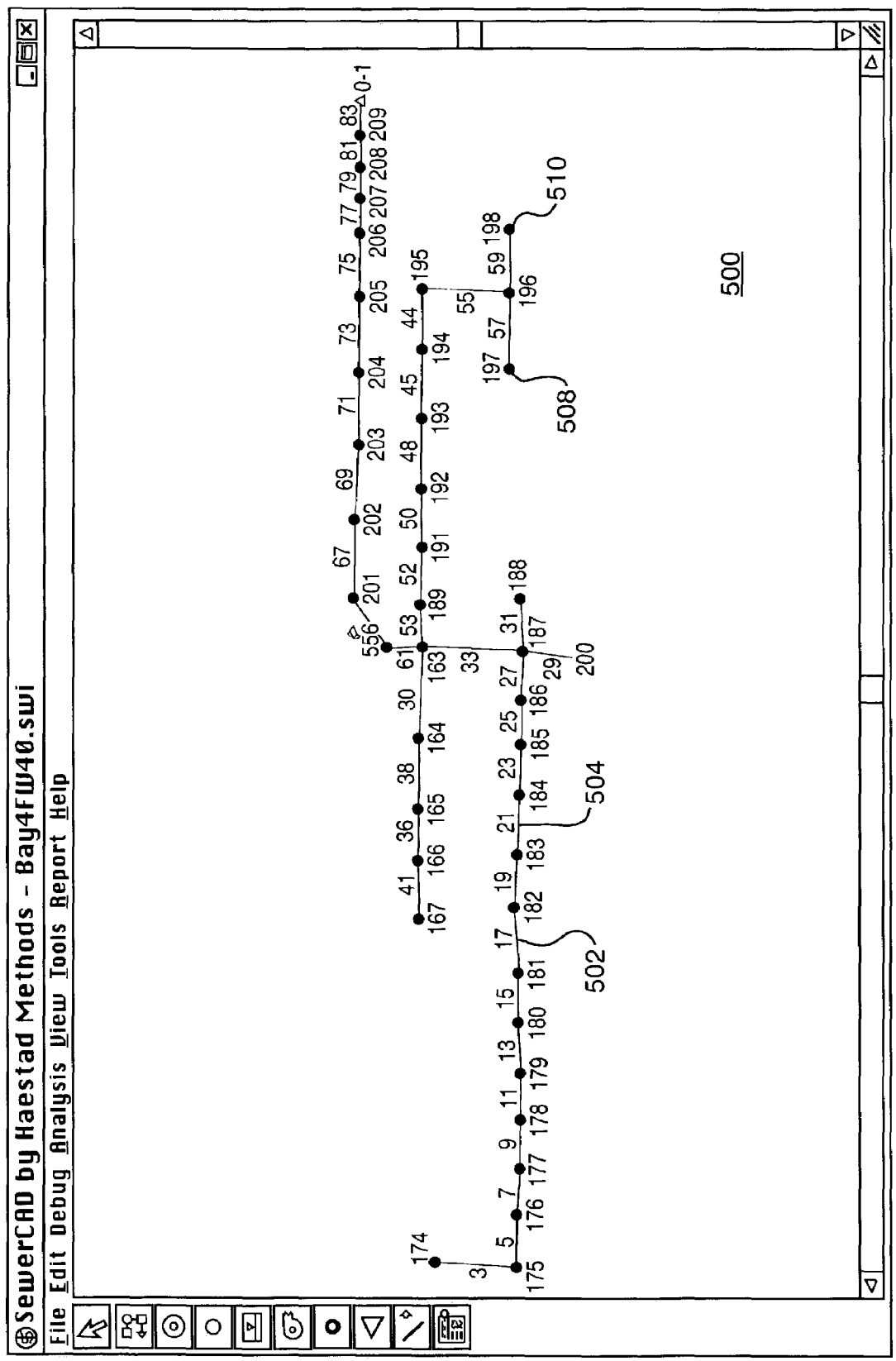
FIG. 5 is a graphic user interface (GUI) illustrating a sanitary sewer system modeled using the software of the present invention.

FIG. 5 illustrates a sanitary sewer system which has been tested in accordance with the software of the present invention. The sewer system 500 has 40 pipes and 40 manhole junctions. The pipes are shown as the links straight lines 502, 504 and the manholes are shown as nodes 508, 510. The pipe network has a wide range of pipe slopes (from 0–0.06). This results in some subcritical-supercritical mixed flow transitions. The unsteady flow for this system has three peaks corresponding to hydraulic conditions in the simulated sewer system of (a) those gravity open channel free surface flow conditions with a few pipes getting slightly pressurized; (b) most pipes are pressurized at some point during the simulation; and (c) street flooding conditions are involved in a few manholes at different locations in the system at some point during the simulation.

Figure 6:
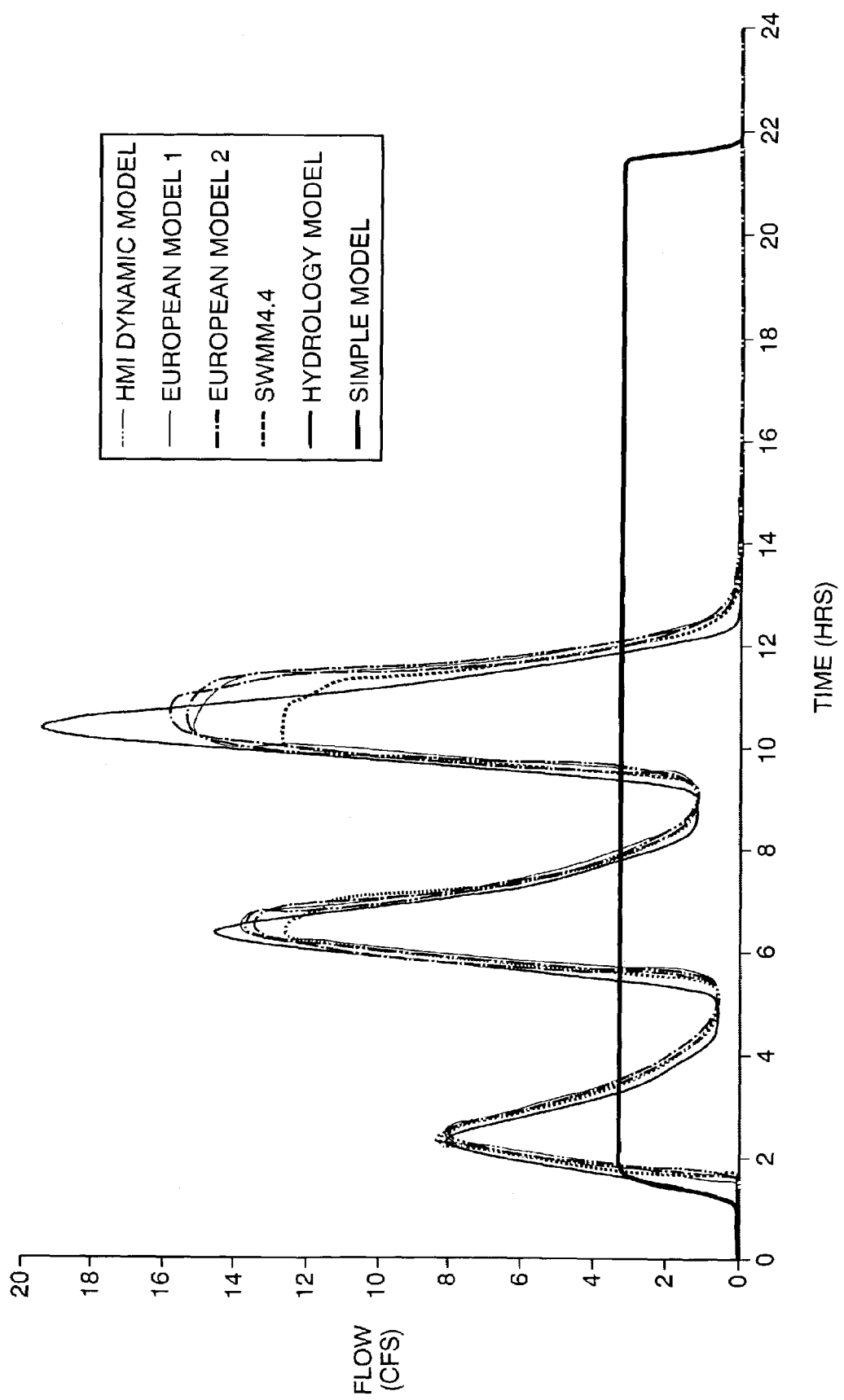
FIG. 6 is a graph plotting time against flow and comparing results of various models.

Each of these aspects was computed and the results are shown in FIG. 6. FIG. 6 shows the computer discharge hydrograph 600 at the outlet and also the results are shown from a simple commercial sewer routing model. A hydrologic model and explicit numerical model and two dynamic models. As seen from the results, the simple model fails to model even minor pressure conditions and the model is based on the explicit scheme and hydrology method are unable to correctly simulate street flooding. This results from three implicit scheme-based fully dynamic models. The dynamic model of the present invention is found to run 25% faster than commercially available flow dynamic model and 120% faster than the explicit based model.

It should be understood that the software of the present invention allows water resource engineers to develop a dynamic sewer model that is based on the full hydrodynamic solution of one-dimensional unsteady flow equations. The model uses a four-point implicit finite difference scheme that has the advantage of having good stability for large computational time steps while maintaining good accuracy. The software of the present invention exhibits robustness in modeling very complex situations such as interchanges between open channel gravity flows, pressure flows, and storage effect from street flooding, bifurcated pipe networks, flow regime changes between subcritical and supercritical conditions and the like. The software tool achieves computational performance and robustness needed for commercial software for practical uses and water resource engineering.

The foregoing description has been directed to specific embodiments of the invention. It will be apparent, however, that other variations and modifications may be made to the described embodiments, with the attainment of some or all of the advantages of such. Therefore, it is the object of the appended claims to cover all such variations and modifications as come within the true spirit and scope of the invention.

What is claimed is:

1. A method of developing a software model of one-dimensional implicit numerical dynamic sewer and storm water drainage system, including the steps of:
    (A) providing a set of hydraulic categories that include flow regimes, pipe networks, pressurized flows and gravity flows, and special flow regimes;
    (B) identifying at least one portion of the dynamic sewer and storm water drainage system as falling within a particular hydraulic category;
    (C) selecting an implicit four-point, finite-difference solution modified to describe each category to develop a predetermined numerical equation to apply to each hydraulic category;
    (D) setting initial conditions; and
    (E) solving the predetermined numerical equation for each portion of the network identified, whereby a numerical model of the sewer and storm water drainage system is produced.

2. The method of developing a software model of one-dimensional implicit numerical dynamic sewer and storm water drainage system as defined in claim 1, including the further step of:
    (A) providing as an hydraulic category, a sewer pipe network; and
    (B) decomposing the network into individual branches using an extended relaxation technique;
    (C) treating the influence of nearest branches as lateral flow, stage, or discharge boundary conditions;
    (D) setting an individual branch as having two cross sections, a first cross section being just upstream of its junction with another branch, and a second cross section being just downstream of another branch;
    (E) assuming lateral inflow and outflow; and
    (F) determining said implicit four-point, finite-difference solutions for each branch independently using a Newton-Raphson iteration, and summing the solutions whereby a numerical model of the sewer pipe network portion of the system is produced.

3. The method of developing a software model of one-dimensional implicit numerical dynamic sewer and storm water drainage system as defined in claim 2, including the further step of:
    numbering each individual branch such that dendritical branches are treated before loop branches.

4. The method of developing a software model of one-dimensional implicit numerical dynamic sewer and storm water drainage system as defined in claim 3, including the further step of:
    numbering each individual branch such that a connecting branch is numbered after the branch to which it is connected.

5. The method of developing a software model of one-dimensional implicit numerical dynamic sewer and storm water drainage system as defined in claim 1, including the further step of:
    simulating internal boundaries and external boundaries.

6. The method of developing a software model of one-dimensional implicit numerical dynamic sewer and storm water drainage system as defined in claim 5, including the further step of:
    simulating internal boundaries and external boundaries by applying a predetermined alternative equation that describes hydraulic behavior at that particular boundary.

7. The method of developing a software model of one-dimensional implicit numerical dynamic sewer and storm water drainage system as defined in claim 5, including the further step of:
    applying as said predetermined alternative equation a storage equation, which takes account of dynamically changing storage volumes in the system.

8. The method of developing a software model of one-dimensional implicit numerical dynamic sewer and storm water drainage system as defined in claim 5, including the further step of:
    applying as said predetermined alternative equation, an energy equation to simulate sewer junctions and manholes.

9. The method of developing a software model of one-dimensional implicit numerical dynamic sewer and storm water drainage system as defined in claim 5, including the further step of:
    applying as said predetermined alternative equation, a weir flow equations and gate flow equations to generate matrix elements for hydraulic controlling structures.

10. The method of developing a software model of one-dimensional implicit numerical dynamic sewer and storm water drainage system as defined in claim 5, including the further step of:
    applying as said predetermined alternative equation, a normal flow equation or a critical flow equation, for flow regime changes at junctions.

11. The method of developing a software model of one-dimensional implicit numerical dynamic sewer and storm water drainage system as defined in claim 1, including the further step of:
    applying a Preissman slot technique when the hydraulic category selected includes a closed conduit.

12. The method of developing a software model of one-dimensional implicit numerical dynamic sewer and storm water drainage system as defined in claim 11, including the further step of:
    applying said Preissman slot technique in such a manner that the slot extends vertically from pipe crown to infinity and over the entire length the pipe, and the width of the slot is usually 1% of the characteristic pipe dimension (diameter for a circular pipe) but not large than 0.02 ft, when the hydraulic category selected includes a closed conduit.

* * * * *